Jan. 3, 1939.  L. R TEEPLE  2,142,462
STOKER CONTROL SWITCH
Filed Dec. 27, 1935  3 Sheets-Sheet 1
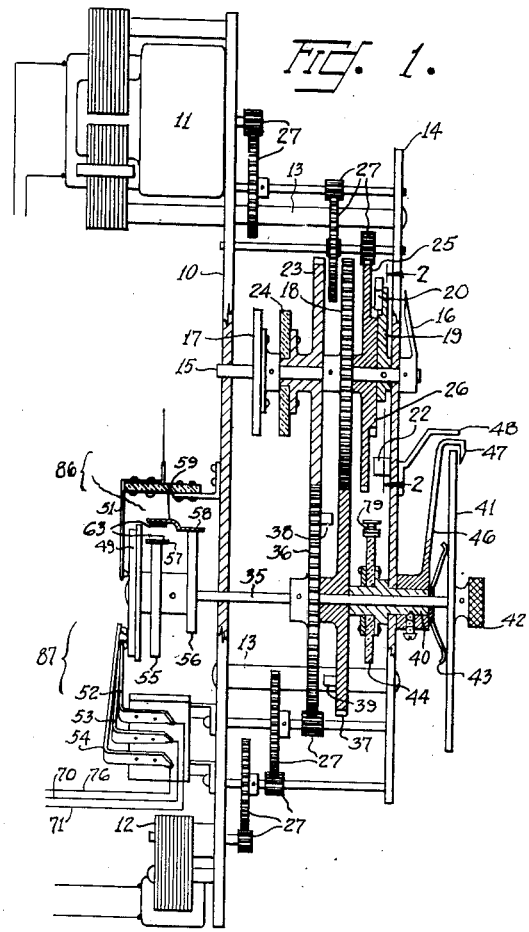
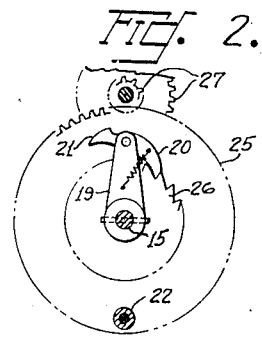
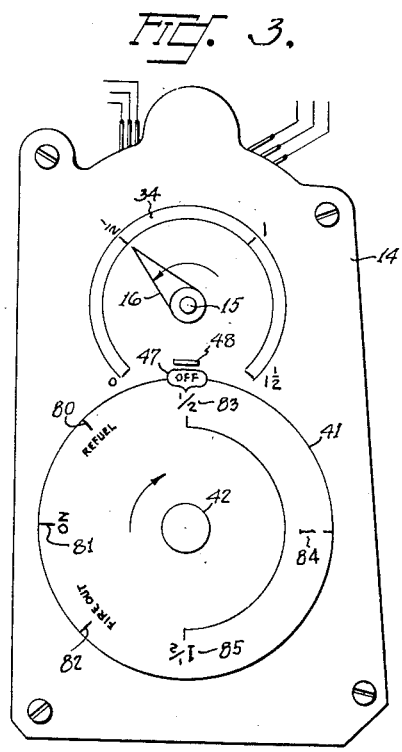
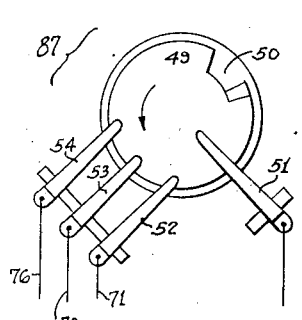
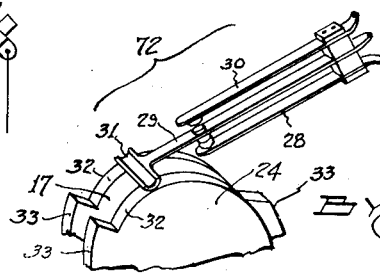
INVENTOR
L. R. TEEPLE
ATTORNEY Jan. 3, 1939.　　　　　L. R. TEEPLE　　　　　2,142,462
STOKER CONTROL SWITCH
Filed Dec. 27, 1935　　　　　3 Sheets-Sheet 2

INVENTOR
L. R. TEEPLE
BY
ATTORNEY

Jan. 3, 1939.  L. R TEEPLE  2,142,462
STOKER CONTROL SWITCH
Filed Dec. 27, 1935   3 Sheets-Sheet 3
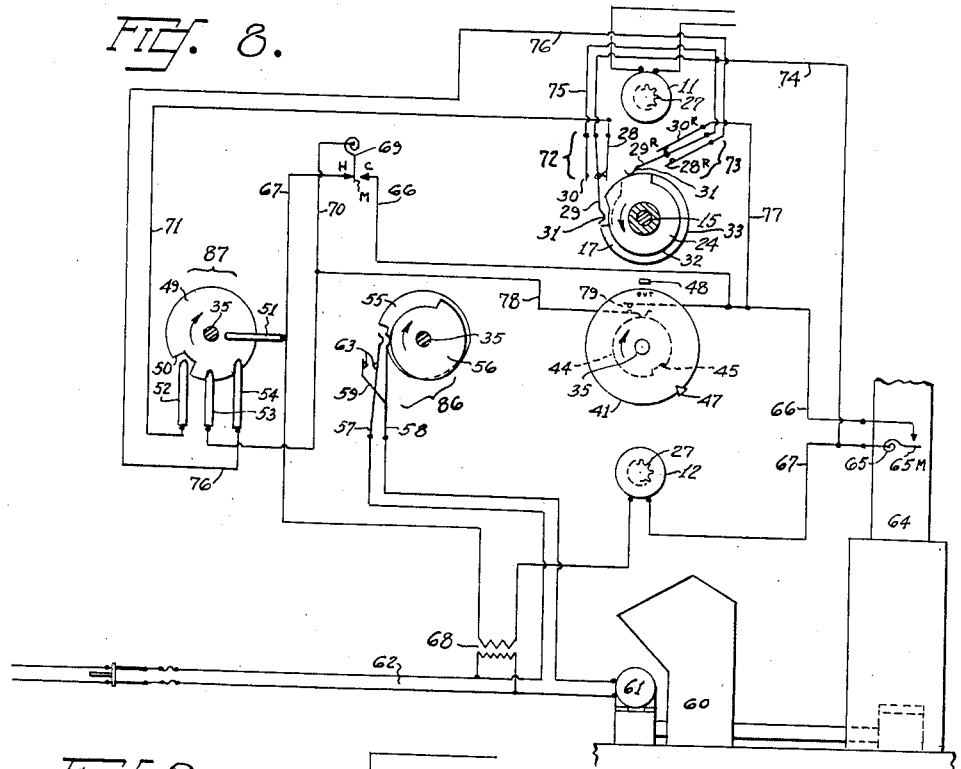
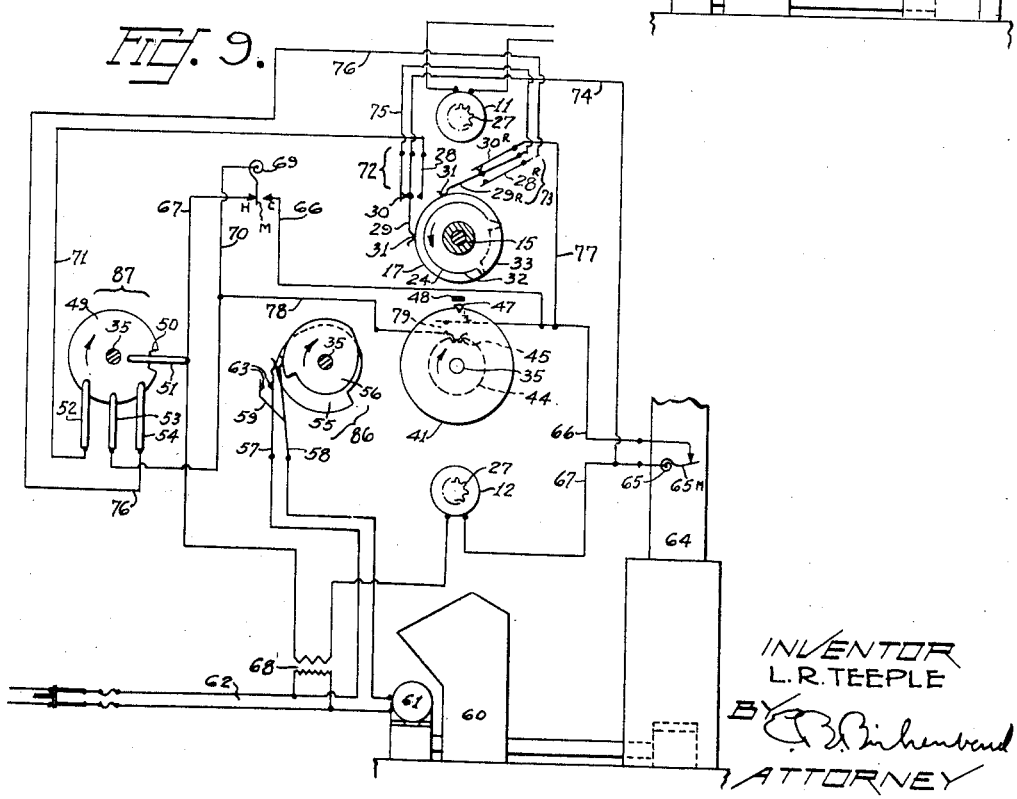
INVENTOR
L. R. TEEPLE
ATTORNEY Patented Jan. 3, 1939

2,142,462

UNITED STATES PATENT OFFICE 2,142,462

STOKER CONTROL SWITCH

Lawrence R. Teeple, Portland, Oreg.

Application December 27, 1935, Serial No. 56,335

19 Claims. (Cl. 236—46)

This invention relates generally to controls for coal burning stokers, and particularly to a stoker control switch.

The main object of this invention is the combining of a timer and a stack thermostat for refueling a stoker whereby the timing mechanism is reset to an initial position at the end of each stoker operation and subsequently turns on the stoker for refueling after a given interval in which no operation occurs and discontinues the operation of the stoker on a rise of stack temperature resetting same to the initial position and conclusively stops the stoker if the temperature of the stack does not rise before the end of a given period of stoker operation.

The second object of this invention is the provision of a stoker control switch whereby any stoker operation intiated by a thermostat immediately suspends the timed refueling operation completely until the thermostat has shut off the stoker and reset the timing mechanism and in which the period of operation permitted the stoker before conclusively shutting it off on absence of fire is always the same regardless of whether the operation is initiated by the thermostat or the timing device.

The third object is to improve the switch described in my Reissue Patent No. 19,164 in which fire rekindling operations are fixed in length by a definite time setting. The present invention adds "fire-out" operation from time and stack and limits the length of the rekindling operation from a stack temperature rise.

The fourth object is to improve the device described in my application, Serial No. 661,452, Patent No. 2,119,187, May 31, 1938, by timing the idle period before a rekindling operation from the stoker shut off instead of from the temperature drop and by adding outfire protection.

The fifth object is to improve the device described in my Patent No. 1,973,128 by adding the "fire-out" operation and limiting the rekindling from the rise instead of from the fixed stack temperature and by spacing the rekindling operation from the end of the previous stoker operation.

The sixth object is to improve the device described in my application, Serial No. 27,275 by spacing the rekindling operation from a stoker shutdown and limiting the length of the rekindling operation from the rise of the stack temperature instead of from a fixed setting and shutting off conclusively if no rise of stack temperature occurs in a given time instead of being dependent on actual value of stack temperature with respect to a setting.

The seventh object is to provide a device of the class described which includes indicating dials and pointers, the positions of which will show the state of and reason for the operation or inoperation of the stoker.

The eighth object is the intermittent determination of the position of the room thermostat and if that position shows that a turn on or turn off operation is approaching, it will execute the operation in advance of the thermostat.

The ninth object is to utilize the desirable features of a switch, the operation or inoperation of which is determined by the relative positions of a plurality of cams with respect to each other, as well as by the relative position of each or all of them with respect to the switch member.

I accomplish these and other objects in the manner set forth in the following specification as illustrated in the accompanying drawings, in which:

Fig. 1 is a side elevation, partly in section.

Fig. 2 is a section taken along the line 2—2 in Fig. 1.

Fig. 3 is a front elevation of the switch.

Fig. 4 is a rear elevation showing the contact plate for the "out", "on", and "refueling" circuits.

Fig. 5 is a fragmentary perspective view showing the construction of the "refueling" and "fire-out" switches.

Fig. 8 is similar to Fig. 7 with the parts in an assumed position in which the fire has gone out and the stack is cool and in which the dial following a measured period of operation has moved to the "out" position in which no operation can be started by the device itself or by the thermostat unless the fire is first lighted manually and the stack heated thereby or the dial is turned manually.

Fig. 9 is similar to Fig. 8 showing the parts in position just after a normal shutting off of the stoker with the stack hot and the room warm.

Similar numbers of reference refer to similar parts throughout the several views.

Figure 6:
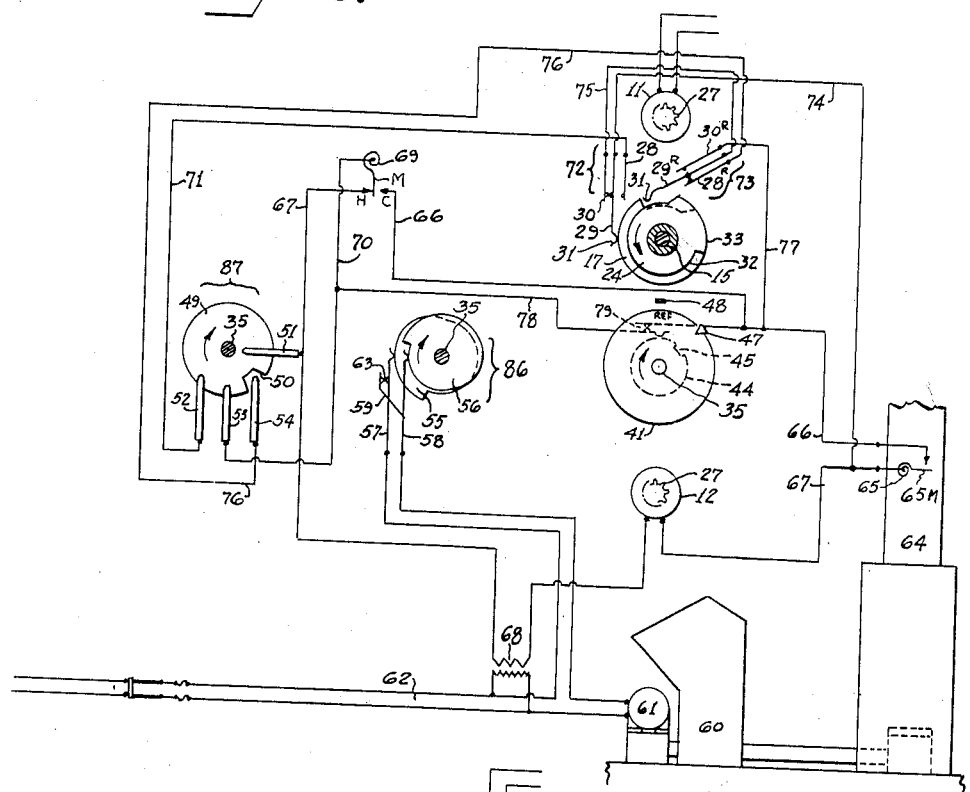
Fig. 6 is a diagram showing the various circuits in a position in which it is assumed that a "refueling" operation has just been initiated by the timing device, the room is warm, the stack cool, and the stoker running.

Referring in detail to the mechanism, same will be seen to include a back plate 10 behind which is mounted the slow speed timing motor 11 and the high speed switch operating motor 12, these being of the synchronous type and of a size suitable for the purpose intended. In front of the plate 10 and spaced therefrom by the pillars 13 is a front plate 14. Journaling in the plates 10 and 14 is a time drive shaft 15.

A pointer 16 is secured to the shaft 15 in front of the plate 14. Secured on the shaft 15 between the plates 10 and 14 is the switching cam 17, a main time drive gear 18 and a ratchet pawl arm 19, whose pawl 20 is provided with an outwardly extending end 21 which can engage a roller 22 mounted on the rear of the plate 14 when the arm is sufficiently rotated so as to lift pawl 20 when the arm 19 has rotated 180° from the position shown in Figure 2.

Between the cam 17 and the gear 18 is disposed a cam gear 23 which is revolvable with relation to the shaft 15. Secured to the gear 23 is a cam 24.

Between the gear 18 and the arm 19 is the ratchet wheel gear 25 which carries the ratchet wheel 26. The ratchet wheel gear 25 is driven positively by the timing motor 11 through the reduction gears 27.

The cam 17 is driven by the timing motor 11 at a speed which in this case is two hours per revolution. This cam 17 has approximately ninety degrees of its outer surface cut away, while the cam 24 which is driven at a much higher speed, namely one revolution in a few seconds, has nearly three-fourths of its outer surface cut away. In other words, when the two cams 17 and 24 are brought into a corresponding relationship, these two cams present a cylindrical outer surface; whereas if they are rotated away from this relationship, as will be explained later, they present varying depressed areas at different positions around the axis of the shaft 15.

Supported by the plate 10 and insulated therefrom are the contact arms 28, 29 and 30, constituting the "fire-out" switch 72. The arm 29 has formed on its outer end a shoe 31 which is wide enough to ride on either of the cams 17 and 24 separately or on both at the same time depending, of course, upon the relative position. If, for example, the cams 17 and 24 are turned so that the shoe 31 rides upon their depressed areas 32, then the arm 29 contacts with the arm 28, but if the shoe 31 rides upon either or both of the raised areas 33, then the arm 29 contacts with the arm 30. Three identical contacting arms 28R, 29R and 30R are similarly mounted about cams 17 and 24. but the arm 29R rides at a different point on their periphery. These arms constitute "refueling" switch 73.

It is desirable to provide a scale 34 on the front plate 14 on which is indicated the fractions of an hour, indicating the distance in time to the next refueling period. For example, as shown in Fig. 3, the position of the pointer 16 indicates that the next refueling period will commence one-half hour later.

Rotatably extending through the plates 10 and 14 is a switch operating drive shaft 35 which has secured thereto a switch operating pin gear 36 which meshes with the gear 23, which it equals in diameter. The gear 36 is driven by the switch operating motor 12 through the reduction gears 27. Loosely mounted on the shaft 35 is a pin gear 37 which meshes with the gear 18 and equals same in diameter. The pin gears 36 and 37 are so-called because of the fact that the gear 36 has a pin 38 projecting from one side thereof and the gear 37 has a pin 39 projecting into the path of the pin 38.

Figure 7:
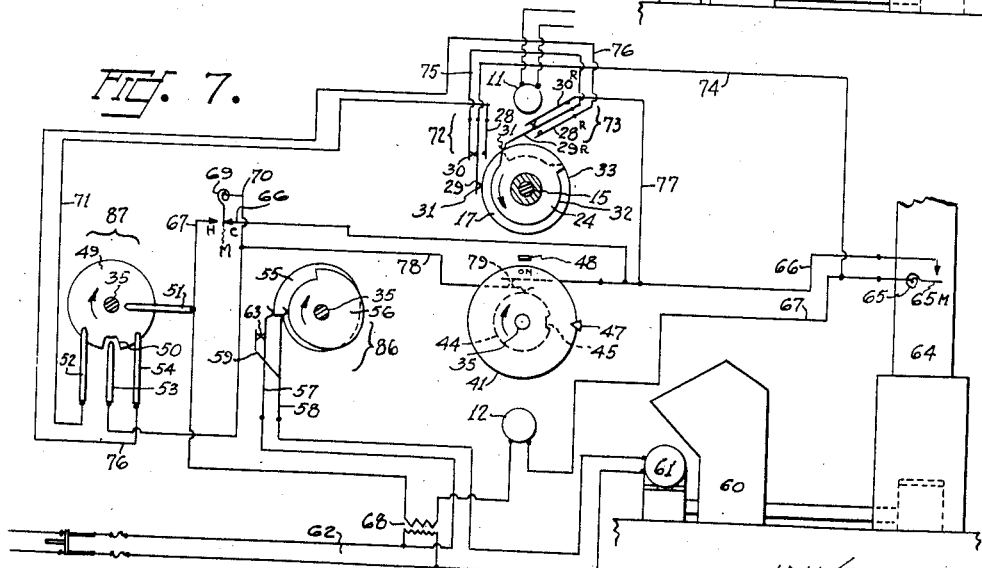
Fig. 7 is similar to Fig. 6, but showing the stoker just turned on by the room thermostat with the stack still cool.

It will be noted that the paths of travel of the pins 38 and 39 coincide, therefore, if the gear 36 is turned through one revolution, the pin 38 on the gear 36, which is driven by the operating motor 12, will engage the pin 39 and advance it together with the cam 17 on the shaft 15. This is the means used to reset the time operated cam 17 and with the pins thus engaged the companion cams 17 and 24 are so positioned that the high part of each will overlap the low part of the other, as shown in Fig. 7, thus holding the switches in their upper or normal positions. The cam 17 is permitted to be advanced in this fashion by the ratchet pawl 20, but as soon as the motion ceases, the pawl 20 reengages the timing motor 11 which slowly rotates the cam 17 forward from the cam 24 and moves the driven pin 39 away from the pin 38 which has been driving it.

The front end of the shaft 35 extends through a bushing 40 which is rotatable within the plate 14 for adjustment purposes. On the front end of the shaft 35 is secured a position indicating dial 41 which is provided with a turning knob 42. The dial 41 is frictionally connected to the bushing 40 by means of the spring 43.

Secured to the bushing 40 is a leaf actuating disc 44 which is provided with a notch 45. Secured to the bushing 40 is an indicator arm 46 whose pointer 47 extends along the outer edge of the dial 41. A fixed indicator 48 is secured to the front plate 14. The dial 41 has marked on the front thereof various positions on the dial which, in conjunction with the indicator 48, will indicate the particular portion of the variable cycle in which the device is operated.

On the rear end of the shaft 35 is secured the position controlling disc 49 from which a segment 50 has been removed. Riding on the face of the disc 49 are four contacting brushes. One of the brushes 51 rides on the disc near its center and makes contact throughout the cycle. The other three brushes are in this case spaced approximately forty-five degrees apart about the disc near its periphery, and each is insulated from the disc 49 in turn as the open segment 50 passes under it. Of these three brushes the brush 52 will be referred to as the "fire-out" brush, the brush 53 as the "on" brush, and the brush 54 as the "refueling" brush.

Also secured on the shaft 35 are the stoker motor switch cams 55 and 56. A brush 57 rides upon the cam 55 and a brush 58 rides upon the cam 56. The brush 58 has a laterally extending arm 59 provided with a contact point 63 which makes contact with a similar point 63 on the brush 57.

For the purpose of illustrating this invention, there is shown a stoker 60, whose motor 61 is placed in the power circuit 62, which is opened or closed by the brushes 57 and 58 through their controlling action upon the contact points 63. There is also indicated a stack 64 in which is placed a thermostat 65 which is arranged to close a circuit through the wires 66 and 67 when the temperature of the stack 64 rises, or open the circuit when the stack temperature falls. The wire 67 passes through the switch operating motor 12 through the transformer 68 to the hot side H of the room thermostat 69, whose cold side C is connected to the wire 66. The wire 67 is also connected to the brush 51. The movable contact M of the thermostat 69 is joined by a wire 70 to the "on" brush 53. The "fire-out" brush 52 is connected by means of a wire 71 to the contact arm 28 of the "fire-out" switch 72, shown in Fig. 5, which as stated is identical with the "refueling" switch 73.

The contact arm 29 of the "fire-out" switch 72 is connected to the moving member 65M of the stack thermostat 65, that is to the wire 67, by means of a wire 74. The contact arm 30 of the "fire-out" switch 72 is joined by a wire 75 to the contact arm 29R of the "refueling" switch 73. The contact arm 28R of the "refueling" switch 73 is joined by a wire 76 to the "refueling" brush 54. The arm 30R of the "refueling" switch 73 is joined by a wire 77 to the wire 66.

Between the wire 66 and the wire 70 is connected a wire 78, between the ends of which is placed a leaf switch 79 which is actuated by the leaf actuating disc 44.

On the position indicating dial 41 is indicated the "refueling" position 80, the "on" position 81, and the "fire-out" position 82. One half of the circumference of the dial 41 carries the spaced values 83, 84 and 85 of one-half hour, one hour, and one and one-half hours, respectively, these representing the required idle period which must elapse before refueling can occur. That is to say, if it is desired to refuel the fire following every one hour of stoker inoperation, the pointer 47 is set to the character 84 which corresponds with a one hour interval.

The operation of this device centers about the functioning of two switches. The "refueling" switch 73, operating in conjunction with the stack thermostat 65, periodically initiates stoker operation for fire maintenance. The "fire-out" switch 72 in conjunction with the stack thermostat 65 conclusively shuts off the stoker if the fire is out.

The two switches 72 and 73 are time spaced about and actuated by the cams 17 and 24 which revolve about the shaft 15. The actuated member 31 of each of the switches 72 and 73 bridges across both cams 17 and 24. Consequently, the operation of either of the switches 72 or 73 occurs only when the gaps in both cams 17 and 24 coincide beneath a switch shoe 31.

The cam 17 is driven by the timing motor 11 at a very slow speed, as stated. This cam is fastened to its shaft 15 to which is also fastened the ratchet pawl arm 19 and the gear 18. Since the pawl arm 19 is driven by the ratchet wheel 26 which is attached to the gear 25 which in turn is driven by the time motor 11, and the gear 25 is free to rotate on the shaft 15, it follows that the timing motor 11 can drive the shaft 15 at a slow speed in one direction but the shaft 15 can be driven at a higher speed in the same direction by the motor 12 through the action of the gears 36 and 37 and their connecting pins 38 and 39 inasmuch as the gear 37 meshes with the gear 18, which latter gear is secured to the shaft 15.

As stated, the switch operating motor 12 operates at a relatively high speed, namely one revolution in a few seconds, and this motion is transmitted to the gear 38 and thence to the gear 23 which drives the switching cam 24.

The two cams 55 and 56 and the parts 57 to 59, inclusive, and 63 constitute the stoker motor switch 86, while the disc 49 and the parts 51 to 54, inclusive, constitute the position controlling switch 87. The switches 86 and 87 are actuated from the same shaft 35 to which is frictionally attached the dial pointer 47 and which pointer is fixedly attached to the leaf actuating disc 44 which operates the positioning leaf switch 79. The pointer 47 indicates on the scale of the dial 41 the length of time the stoker must remain idle before a refueling operation is initiated.

As stated, the brush 51 rides on the disc 49 near its center and makes contact therewith throughout the cycle, while the brushes 52, 53 and 54 are spaced forty-five degrees apart about the disc near its periphery in the path of the open segment 50. Consequently, the location of the brush which carries the operating motor circuit under any given set of conditions will determine the angular travel of all members attached to the shaft 35. Similarly, the setting of the leaf actuating disc 44 will determine the angular rotation of the shaft 35 whenever conditions cause the circuit of the operating motor 12 to be completed through this switch. The operating motor circuits, referred to, are completed selectively by switches 72 or 73 or thermostats 65 or 69 in response to lapse of time or change of temperature.

There are, therefore, three fixed rest positions of all parts driven directly by the operating motor 12 as determined by the brushes 52, 53 and 54 on the edge of the disc 49 and a fourth position adjustable by moving the pointer 47 which determines the position in which contact will be broken by the positioning leaf switch 79. The latter is the position in which the mechanism comes to rest following a normal shut-off of the stoker at the termination of a refueling or thermostat operation (Figure 9).

Next in sequence are the "refueling" position, determined by the brush 54, the normal "on" position, as determined by the brush 53, and the "out-fire" position, as determined by the brush 52, and so back to the normal "off" position, as determined by the leaf switch 79. The stoker motor switch 86 closes just before the "refuel" position and opens between the normal "on" and "fire-out" positions.

If the resetting of the time driven cam 17 has taken place during the normal shutting-off of the stoker, then the operating motor 12 is stopped by the opening of the positioning leaf switch 79. The switching cam 24 will stop in position to allow switches 72 and 73 to drop, as shown in Fig. 9. These switches are held up, however, by the cam 17, which then slowly revolves until the timing motor 11 has measured off a period of time equivalent to the setting of the pointer 47 on the position indicating dial by which time the stack thermostat 65 would normally be open, i. e., cooling. At the end of this time (as the refuel indicating pointer 16 reaches zero) the switch 73 drops completing the circuit 29R, 28R, 76, 54, 49, 51, 67, transformer 68, 67, 12, 67, 74, 29, 30, 75, 29R through the brush 54, causing the operating motor 12 to rotate the shaft 35 sufficiently to turn on the stoker, but not sufficiently to reengage the pins 38 and 39 or to raise the switch arm 29R to a normal position. The operating motor 12 is stopped as soon as the missing segment 50 in the disc 49 comes to the ("refuel") positioning brush 54, all parts then being in positions shown in Fig. 6.

The timing motor 11 continues to advance the cam 17 toward the "fire-out" switch 72, which is positioned angularly from the "refueling" switch 73 in accordance with the length of time ("fire-out" period) which the stoker may be run before being conclusively shut off in the event that there is no fire.

Normally the stack thermostat 65 will react to the heat generated by the fire before this period has elapsed, and in closing will form a circuit through the closed positioning leaf switch 79, 66, 65M, 67 12, 67, 68, 67, 51, 49, 53, 70, 78, 79 until contact between brush 53 and position controlling disk 49 is broken ("on" position). Since room thermostat contacts H—M parallel 53—49, the motor circuit will be continued which will cause the operating motor 12 to revolve the dial shaft 35 sufficiently to turn off the stoker motor 61 and reset the time-actuated cam 17 and open contacts 79 (normal shut-off). Notice, however, that should thermostat contact M now be midway between H and C the stoker will continue to operate, and the mechanism will, in effect, have responded to a decline of room temperature not yet of sufficient magnitude to close M and C.

The actual position in which the dial 41 comes to rest following a normal shut-off is dependent upon the setting of the pointer 47, since the position to which the cam 17 is carried during this operation will determine the time which must subsequently elapse before this cam can again trip the switch 73 and initiate the next refueling period.

In case the fire is out and does not respond to a refuel operation the stoker will be allowed to run the full "fire-out" period following which the cam 17 will permit the "fire-out" switch 72 to trip since the cam 24 is not now in position to interfere with this operation. (See Fig. 6.)

A circuit is then set up through the "fire-out" brush 52, 49, 51, 67, 68, 67, 12, 67,74, 29, 28, 71, 52, which will cause the operating motor 12 to revolve the dial sufficiently to stop the stoker, but not sufficiently to reengage the pins 38 and 39 or to move the "fire-out" switch 72 back to its normal position. The fact that the switch 73 is reset during this operation is of no consequence, since it is not in the circuit. When the dial 41 comes to rest in the "fire-out" position, the thermostat 69 cannot again start the stoker unless the fire is rebuilt or the dial is turned manually.

Furthermore, the timing motor 11 being mechanically disconnected from the cam 17 by the roller 22 which releases pawl 20 from ratchet wheel 26 immediately after the switch 72 trips, cannot further advance the cam 17 and in this way reset the "fire-out" switch 72.

At any time prior to a refueling operation, cooling of the thermostat 69 until it contacts C will turn on the stoker. This action is brought about by a circuit M, C, 66, 77, 30R, 29R, 75, 30, 29, 74, 67, 12, 67, 68, 67, 51, 49, 53, 70, M, initiated through the thermostat 69 but held through the leaf switch 79 which causes the operating motor 12 to revolve the dial 41 until the missing segment 50 of the disc 49 lies under the second or normal "on" brush 53 as shown in Fig. 7. Since this brush 53 lies beyond the "refueling" position, the pins 38 and 39 are always engaged before the end of this operation and the cams 17 and 24 are advanced together, thus preventing the "refueling" switch 73 from tripping. When they come to rest, the cam 24 is in position to hold up the "refueling" switch 73, but the "fire-out" switch 72 is held up only by cam 17 which is in exactly the same position as at the beginning of a "refueling" period. Therefore, as cam 17 is advanced subsequently by the timing motor 11, the time which must elapse before the switch 72 may drop and shut off the stoker in case there is no fire, will be exactly the same as when this time is measured from the beginning of a "refueling" period.

When the "fire-out" switch 72 drops at the end of this time, the stoker will be conclusively shut off as previously described provided the stack thermostat 65 has not, in the meantime, closed.

In case the fire is burning and the stack thermostat 65 has closed under a rise in temperature, a circuit will be set up for the operating motor 12 when the switch 72 trips that will turn off the stoker as explained as when the stack thermostat 65 is open after which a new circuit 12, 67, 68, 67, 51, 49, 53, 70, 78, 79, 78, 66, 65M, 67, 12 is set up which continues to energize the motor until the dial 41 reaches the normal "off" position (Fig. 9). Immediately the thermostat 69 will restart it, if still on the cold side, and thus reset the cams 17 and 24 to position shown in Fig. 7. The stoker will then continue to operate subject to this periodic trial of fire condition and room thermostat position until the thermostat 69 is satisfied, whereupon it will be shut off and the cams 17 and 24 reset in the same manner as at the normal close of a refueling period as shown in Fig. 9.

In case thermostat 69 has responded to rise in room temperature sufficiently so that M is midway between H and C when switch 72 drops and causes a trial cycling, then the dial 41 will come to rest in the normal "off" position and the stoker will remain shut down. Thus it will be seen that, in addition to its other improvements, the invention also provides a means of anticipating the action of the room thermostat when the temperature is either rising or falling, a desirable characteristic which makes for more even regulation of room temperature.

Summarizing, it will be noted that should the thermostat 69 call for heat during a "refueling" period, it will as soon as the stack 64 heats up advance the dial 41 and the position controlling disc 49 to the normal "on" position without affecting the operation of the stoker. The thermostat 69 can turn on the stoker at any time unless a continuous timed period of operation has failed to raise the temperature of the stack 64 and has caused the mechanism to move to the "fire-out" position. The thermostat 69 can turn off the stoker at any time except during the "refueling" period. This operation takes place normally even though the stack 64 may be cold due to the closure of the cams 17 and 24 preventing the "fire-out" switch 72 from tripping during this operation.

Refueling operation is initiated only after a predetermined period of inoperation as set by the pointer 47 on the position indicating dial 41. The length of the "refueling" operation is variable, being dependent on the time required to raise the temperature of the stack 64. The stoker is conclusively shut off following any continuous predetermined period of operation which does not result in an increase of stack temperature and may be restarted only by rebuilding the fire and/or resetting the mechanism.

The stack thermostat 65, referred to in the above explanation, may be either of the fixed setting type or of the type which operates on rise and fall of temperature irrespective of value but the latter is preferable. When the latter is used a reasonable lag is provided to insure an effective period of refueling and to prevent the temporary declines in stack temperature which take place during continuous stoker operation due to changes in fuel bed or other factors from falsely bringing about a conclusive shut off.

I claim:

1. In an automatic stoker control including stoker actuating means actuated in response to temperature change, combustion change and/or to time, the combination of a means positioned by said actuating means for indicating the operation or inoperation of a stoker and means automatically positioned for indicating whether inoperation is due to fulfilled requirements of temperature and refueling or to the extinguishment of the fire.

2. The combination with a stoker motor, a motor control circuit including a stack switch, a refueling switch and a fire-out switch, of a cam having a portion successively engaging said refueling and fire-out switches, and a second cam angularly movable with respect to the first cam and movable to position to render said portion of the first cam operative or inoperative depending upon the position of the second cam, said first cam moving first to engage the refueling switch and then to engage the fire-out switch to conclusively stop the stoker motor, said second cam moving to position to render the fire-out switch inoperative when ever the stack safety switch has closed before the first cam reaches position to operate the fire-out switch.

3. The combination with a stoker motor, a motor control circuit including a stack switch, a refueling switch and a fire-out switch, of two coaxial cams movable together or separately, each of said cams movable to contact said switches in succession in the order stated, and means governed by an increase in the stack temperature for moving the cams into such angular relationship, as not to operate the fire-out switch.

4. The combination with a stoker motor, a motor control circuit including a stack switch, a refueling switch and a fire-out switch, of a slow speed time train and a high speed switching train, including means for causing one member of the high speed train to overhaul one member of the slow speed train and move the members to an initial relationship corresponding with their position at the beginning of a timed period of stoker inoperation, means for causing the conclusive stopping of both of the trains at the end of a period of timed operation whenever the stack switch has not closed within such period of time.

5. The combination with a stoker motor and its control circuit including a fire-out switch and a refueling switch, of a time driven cam having a cut away portion to permit the switches to move to position respectively to cause the stoker motor to run and to cause the stoker motor to stop, a second cam having a raised portion of such arcuate length as to close the recess in the first cam, and means governed by the changes in temperature of the stack for causing the lowered portions of the cams to coincide to permit the refueling switch to operate and for moving the cams into such relative angular position as to prevent the refueling switch from operating.

6. A motor control circuit including a pair of spaced switches, a pair of cams in position to operate said switches in succession, the first of said cams normally moving at a constant rate so as to operate the first switch, after a chosen lapse of time to start the motor and after a further lapse of time to move to position to engage the second switch to conclusively stop said motor, and means governed by a rise of stack temperature to cause said second cam to move to stop said motor and then to move to position to prevent the first cam from moving the second switch to conclusively stop said motor.

7. The combination with a stoker motor and its control of an indicator operatively connected to the control mechanism and carrying indicating marks denoting refueling, fire-out, and operation due to a call for heat, and means including said indicator for changing the operating time of said control mechanism.

8. The combination with a stoker motor and its control of an indicator operatively connected to the control mechanism and carrying marks indicating respectively: the stoker motor is operating in response to time control, the stoker motor is operating in response to thermal control, the stoker motor is not operating because the fire has gone out; and a further indicator for indicating the portion of the chosen time between timed feedings that remains before the stoker motor will again start to operate in response to time control.

9. The combination with a stoker and its control mechanism of an indicator showing the period between refueling for which the mechanism has been set and a further indicator indicating what portion of such period is still to run, and means including one of said indicators for adjusting the operating time of said control mechanism.

10. An automatic control for a coal stoker comprising a room thermostat having a cold contact and a hot contact and a contact movable between the hot and cold contacts in response to temperature changes, means including circuit connections for causing the stoker to operate when the movable contact engages the cold contact, means including circuit connections for causing the stoker to stop when the movable contact engages the hot contact, timing means for causing the stoker to operate after a definite period of inoperation regardless of the engagement or disengagement of the hot contact and movable contact, circuit connections prepared by operation of the timing means for stopping said stoker upon a rise of combustion temperature, and circuit means positioned by operation of the timing means for preventing the operation of the last mentioned means when the movable contact is out of engagement with the other contacts whereby should the room temperature be insufficient to hold the movable contact of the thermostat against the hot contact during the time-controlled refueling operation, the stoker motor will not stop upon rise of the stack temperature but will continue to operate as long as the movable contact is floating between the hot and cold contacts, thus anticipating the call for heat which otherwise would be made as soon as the movable contact touched the cold contact.

11. An automatic control for a coal stoker comprising a room thermostat having a cold contact and a hot contact and a contact movable between the hot and cold contacts in response to temperature changes, means including circuit connections for causing the stoker to operate when the movable contact engages the cold contact, means including circuit connections for causing the stoker to stop when the movable contact engages the hot contact, and means positioned in response to engagement of the movable contact with the cold contact for stopping the stoker when the movable contact is subsequently out of engagement with the other contacts whereby if the room temperature has increased sufficiently to move the movable contact of the thermostat to floating position at the end of said period of thermal controlled fuel feeding, the stoker motor will be shut off, thus anticipating the shutting off of the stoker motor by the movable contact touching the hot contact.

12. In a switch for controlling the operation of a stoker, the combination of a slow speed time train and a high speed switching train including a means for causing said high speed train to overhaul and drive said slow train when the parts of the two trains reach an initial relationship, means for stopping the high speed train when the parts of the trains in said initial relationship reach a position corresponding with the commencement of a timed period of stoker inoperation, switch contacts positioned to be closed by said parts when the parts reach a different relationship due to continued movement of the slow speed train from said position, and means for causing conclusive inoperation of both trains at the end of a period of time beginning with the closing of said switch contact.

13. The device of claim 12 including means for indicating any portion of the cycle through which the switch may be passing.

14. In a stoker control system, temperature responsive means for causing the stoker to operate when the temperature reaches a predetermined value, timing means for operating the stoker after a definite period of inoperation due to a lack of temperature change, means actuated by the timing means and the temperature responsive means for indicating the operation or inoperation of the stoker, and means associated with the indicator means for indicating whether operation has been initiated by the time means or the temperature responsive means.

15. The system of claim 14 in which the indicator means is stopped in one relative position to show that stoker inoperation is due to the extinguishment of the fire but is stopped in another position to show that inoperation is due to fulfilled time or temperature requirements.

16. In a stoker control system including temperature responsive means for operating the stoker according to the heat output required of the stoker, time means for operating the stoker at timed intervals in the absence of any heat requirement, means controlled by said stoker operating means for indicating operation or inoperation of the stoker and means controlled by the stopping of the stoker for indicating whether the resulting inoperation is due to fulfilled heat requirements or to the extinguishment of the stoker fire.

17. In a stoker control system, temperature responsive means for operating a stoker in accordance with the heat required of the stoker, time means for operating the stoker in the absence of temperature change, indicating means controlled by the temperature responsive means and the time means for indicating the operation or inoperation of the stoker, means controlled by the temperature responsive and time means for indicating whether operation has been initiated by temperature requirements or by the time means, further means controlled by the time and temperature responsive means for indicating whether the inoperation of the stoker is due to fulfilled temperature requirements and time operation or to extinguishment of the fire.

18. In a stoker control, in combination a thermostat having hot and cold terminals, a pair of relatively movable cams, means constantly driving one of said cams, a multi-position switch placed for actuation by the combined action of said cams, said action being dependent upon a predetermined co-relationship of said cams and upon a predetermined angular position of each of them, circuit connections between the thermostat and switch and including electromotive means for moving the other cam to change said co-relationship, said electromotive means being energized in response to certain positions of said switch and in combination with certain positions of the thermostat.

19. The combination with a stoker motor and its control circuit including a room thermostat having a leaf movable between hot and cold terminals, and means for keeping the fire alive by causing periodic feeding of fuel and air in absence of calls for heat, of a second control circuit including normally open contacts adapted to be closed by an increase in stack temperature and also including the leaf and hot terminal of said room thermostat whereby said second control circuit is adapted to be closed by an increase in stack temperature when accompanied by an increase in room temperature and in closing to cause the first circuit to stop the stoker motor and terminate a refueling operation, so that should the leaf be floating between the terminals upon increase of stack temperature at' the end of a normal refueling period the motor will not stop but will continue to operate the stoker until the leaf engages said hot terminal, thus anticipating a call for heat by the room thermostat.

LAWRENCE R. TEEPLE.